(12) United States Patent
Siwek et al.

(10) Patent No.: US 12,556,821 B2
(45) Date of Patent: Feb. 17, 2026

(54) IMAGE-PROCESSING DEVICE AND METHOD

(71) Applicant: IDEMIA IDENTITY & SECURITY FRANCE, Courbevoie (FR)

(72) Inventors: Jean-François Siwek, Courbevoie (FR); Karim Ammouche, Courbevoie (FR); Zied El Feki, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 156 days.

(21) Appl. No.: 18/469,065

(22) Filed: Sep. 18, 2023

(65) Prior Publication Data

US 2024/0179415 A1 May 30, 2024

(30) Foreign Application Priority Data

Nov. 24, 2022 (FR) ..................................... 22 12301

(51) Int. Cl.
| | |
|---|---|
| *H04N 23/695* | (2023.01) |
| *G06T 7/246* | (2017.01) |
| *G06V 40/16* | (2022.01) |
| *G06V 40/19* | (2022.01) |
| *H04N 23/20* | (2023.01) |
| *H04N 23/74* | (2023.01) |

(52) U.S. Cl.
CPC ........... *H04N 23/695* (2023.01); *G06T 7/246* (2017.01); *G06V 40/16* (2022.01); *G06V 40/19* (2022.01); *H04N 23/20* (2023.01); *H04N 23/74* (2023.01); *G06T 2207/30201* (2013.01)

(58) Field of Classification Search
None
See application file for complete search history.

(56) References Cited

U.S. PATENT DOCUMENTS

| | | | |
|---|---|---|---|
| 5,926,655 A | * 7/1999 | Irie ......................... | G03B 13/02 396/51 |
| 10,018,893 B2 | * 7/2018 | Malrat ................. | G01B 11/002 |

(Continued)

OTHER PUBLICATIONS

French Preliminary Search Report issued Mar. 23, 2023 in French Application 22 12301 filed on Nov. 24, 2022, 8 pages (with English Translation of Categories of Cited Documents and Written Opinion).

*Primary Examiner* — Stefan Gadomski
(74) *Attorney, Agent, or Firm* — Oblon, McClelland, Maier & Neustadt, L.L.P.

(57) ABSTRACT

A device that includes an image-acquiring system, a synchronous data-processing system that receives setpoints including at least one image-acquisition setpoint, and that determines, depending on at least one of the setpoints, adjustment data of the acquiring system, said synchronous system comprising a synchronous time-stamping means that time stamps, on acquisition, one of the adjustment data of the acquiring system, a means for associating one of the time-stamped adjustment data of the image-acquiring system with said image acquired at the moment of acquisition of the image by adding metadata to said image, an asynchronous system for processing said image with associated metadata, which generates and sends to the synchronous system the setpoints, the image-acquisition setpoint being determined based on an acquired image with associated metadata.

20 Claims, 6 Drawing Sheets

(56) References Cited

U.S. PATENT DOCUMENTS

| | | | |
|---|---|---|---|
| 10,296,602 B1 | 5/2019 | Cooper et al. | |
| 10,592,552 B1* | 3/2020 | Cooper | G06F 16/5866 |
| 11,338,823 B2* | 5/2022 | Guo | G06V 20/49 |
| 11,478,932 B2* | 10/2022 | Knoll | B25J 9/1697 |
| 12,246,458 B2* | 3/2025 | Zhong | G05B 19/4182 |
| 2002/0048456 A1* | 4/2002 | Ohtani | G03B 17/00 |
| | | | 396/51 |
| 2006/0221187 A1 | 10/2006 | Alhadef | |
| 2009/0225275 A1* | 9/2009 | Horie | A61H 5/00 |
| | | | 351/203 |
| 2011/0207417 A1* | 8/2011 | Hays | H04Q 9/04 |
| | | | 455/73 |
| 2016/0124287 A1* | 5/2016 | Malrat | H04N 23/67 |
| | | | 348/345 |
| 2020/0251110 A1* | 8/2020 | Kaku | G06F 3/167 |

\* cited by examiner

IMAGE-PROCESSING DEVICE AND METHOD

CROSS-REFERENCE TO RELATED APPLICATION

The present application claims priority to French Patent Application No. 22 12301, filed on Nov. 24, 2022. The entire content of the foregoing is incorporated herein by reference.

The present invention relates to the field of image processing with a view to recognition, especially of biometric data, for example to the ends of authentication or identification of an individual or verification of the right of the individual to access a given place or given information.

TECHNOLOGICAL BACKGROUND

Conventionally, an image-processing device contains an image-acquiring system, comprising at least one image sensor, and usually a lighting system, for example comprising an infrared light source and/or a white light-emitting diode (LED). The adjustment of the image sensor, for example in terms of exposure time and gain, and of the lighting system, for example in terms of the intensity of the LEDs, must be constantly controlled to tune it to the lighting conditions of the environment. This dynamic control is called automatic gain control (AGC).

Certain image-processing devices also comprise a motorized camera, especially to acquire biometric characteristics such as the iris of an individual.

The aim of AGC is especially to control, in real time, adjustment data of the image-acquiring system and especially of the lighting system in order to optimize certain brightness values in the images, by virtue of analysis of the brightness of images acquired beforehand.

The AGC algorithm typically analyses statistics of the acquired image, i.e. statistics such as average brightness in one or more regions of interest/zones, and histograms of brightness in said image, in light of the adjustment data at the moment of acquisition of said image, that is the exact configuration of the image-acquiring system and especially of the lighting system at the moment when this particular image was acquired. By virtue of this analysis, the AGC algorithm computes a new configuration that better targets the objective. The algorithm controls these parameters iteratively, until parameter stability is achieved. Generally, a delay, for example a delay of 2 images, exists before the new configuration is adopted by the image-acquiring system and/or lighting system, this especially being due to the internal architecture of the image-acquiring system and/or lighting system. The AGC algorithm must therefore take this delay into account if the analysis of the image is to be correct.

If the synchronization between the parameters and the images is poor, the resulting AGC analysis will therefore be poor, this potentially leading to flashes or to over-adjustment of the brightness of the image, degrading convergence and potentially causing inconvenience in the case where an individual is the object that is the subject of the image.

In the field of image-processing devices, especially biometric image-processing devices, the objective is to optimize the statistics of the image, in particular in certain portions of the image (such as a face in the case of a facial recognition device) in the shortest possible time, in order to recognize the individual as rapidly as possible.

Normally, the image-acquiring system is adjusted by an image-signal processor (ISP) that modifies hardware characteristics in real time to apply the parameters computed by the AGC algorithm. However, in certain specific use cases, this operating mode is unsuitable, for example when optimizing the image of a particular object such as a face and/or a QR code, and is also unsuitable in the case of a non-standard image-acquiring system, for example when a non-standard light sensor requiring a specific dedicated adjustment, such as an RGB-IR sensor such as described in patent application FR1911695, is used.

When the parameters computed by the AGC algorithm cannot be implemented by a standard ISP, then they are generally applied via non-real-time software (such as a Linux operating system), because this type of operating system offers the device many other functionalities. However, in this case, it is not possible to know exactly what the configuration parameters of an input frame are, because the time when the non-real-time software sends the configuration is not known exactly, for example because of possible pre-emption by higher priority tasks in the operating system, but also because the acquired images are potentially buffered in a first-in, first-out buffer memory containing a plurality of images.

In this case, the easiest solution is to add a delay of a few frames in the non-real-time software between the time at which the new configuration is sent to the sensor and the first image to be analysed, in order to be sure that the configuration has been applied by the image sensor and/or light source. Specifically, it is necessary in this case to let a plurality of frames, i.e. images, pass before it is possible to perform the computation, this generating a latency of a plurality of time intervals. The consequence is that the AGC loop is much slower, this leading to a longer convergence time and to a poor device response time. Furthermore, in the case of an algorithm used to point a high-resolution camera at a moving object, this latency leads to a decrease in tracking performance and to an absence of determinism, and to an inability to track a rapidly moving individual.

To avoid this long convergence time, one solution would be to activate a metadatum functionality of the image-acquiring sensor, the metadatum containing the exposure/gain parameters of one particular image and allowing these parameters to be known for each image, including without real-time synchronization; however, not all sensors have this functionality and it does not allow the need to know the lighting applied in an image to be met—metadata alone therefore are not enough to meet this need.

Furthermore, in the case of devices requiring not only adjustment of the image sensor, for example in terms of exposure time and/or gain, but also adjustment of a lighting system, i.e. of a light source, especially in terms of the intensity of the infrared light and/or white light generated, it is necessary to know when the new parameters specific to control on the one hand of the image sensor and on the other hand of the light source are applied for the first time so as to know what these configuration parameters of the image sensor and of the light source are at the moment of acquisition of the image, or of processing with a non-real-time processor, and this is problematic because such light sources do not have a metadatum functionality and adding delays considerably slows convergence and, in the end, decreases the performance of the device.

Lastly, a synchronization error (and therefore a timing error) leads, in the case of a moving object, to a position error. A system that estimates a 3D position based on an unsynchronized image will therefore incorrectly position its high-resolution camera. Synchronization errors therefore prevent moving objects from being tracked because they make it impossible to exactly synchronize three-dimensional positions acquired by a context-capturing camera and a positional configuration of the image-acquiring system, such as a high-resolution-camera position, in the context for example of acquisition of irises of moving individuals.

OBJECT OF THE INVENTION

One of the aims of the invention is to remedy at least some of the aforementioned drawbacks by providing a high-performance image-processing device allowing moving objects to be recognized, while limiting its manufacturing cost.

BRIEF SUMMARY OF THE INVENTION

To this end, provision is made, according to the invention, for an image-processing device comprising:
an image-acquiring system;
a synchronous data-processing system that receives at least two setpoints including at least one image-acquisition setpoint, and that determines, depending on at least some of said setpoints, adjustment data of the image-acquiring system, said synchronous system comprising a synchronous time-stamping means that time stamps, at the moment of acquisition of the image, at least one of the adjustment data of the image-acquiring system;
a means for associating the time-stamped at least one of the adjustment data of the image-acquiring system with said image acquired at the moment of acquisition of the image by adding metadata to said acquired image;
an asynchronous system for processing said acquired image with associated metadata, said asynchronous data-processing system generating and sending to the synchronous data-processing system the at least two setpoints, at least the image-acquisition setpoint of which is determined based on at least one of the acquired images with associated metadata and especially on the time-stamped at least one of the adjustment data of the image-acquiring system associated with said at least one acquired image.

This device allows image-processing latency to be avoided while not being entirely real-time and while guaranteeing robustness to image loss, and allows image processing to be freed of the constraint of needing to be synchronous.

Advantageously, the device comprises another system, different from the image-acquiring system, and at least one of the two setpoints is a setpoint intended for the other system, the synchronous data-processing system determining, depending on at least some of said setpoints, adjustment data of the other system, said synchronous time-stamping means time stamping, at the moment of acquisition of the image, at least one of the adjustment data of the other system;
the means associating at least one of the time-stamped adjustment data of the other system with said image acquired at the moment of acquisition of the image, by adding metadata to said acquired image;
the asynchronous system for processing said acquired image with associated metadata generating and sending to the synchronous data-processing system the at least two setpoints, the setpoint intended for the other system being determined based on at least one of the acquired images and on the time-stamped at least one of the adjustment data of the other system and/or of the image-acquiring system associated with said at least one acquired image, so as to allow the acquisition to be synchronized with another independent system and kept adjusted, especially but not exclusively based on the last acquired image.

Advantageously, the other system is a lighting system and the setpoint intended for the other system is a lighting setpoint, this especially making it possible, with the same time-stamping means, to be able to synchronize and keep adjusted the acquiring system and the lighting system. Thus the device comprises a lighting system and at least one of the two setpoints is a lighting setpoint, the synchronous data-processing system determining, depending on at least some of said setpoints, adjustment data of the lighting system, said synchronous time-stamping means time stamping, at the moment of acquisition of the image, at least one of the adjustment data of the lighting system;
the associating means associating at least one of the time-stamped adjustment data of the lighting system with said image acquired at the moment of acquisition of the image, by adding metadata to said acquired image;
the asynchronous system for processing said acquired image with associated metadata generating and sending to the synchronous data-processing system the at least two setpoints, at least the lighting setpoint of which is determined based on at least one of the acquired images and on the time-stamped at least one of the adjustment data of the lighting system and/or of the image-acquiring system associated with said at least one acquired image.

Advantageously, the lighting system comprises a source of infrared radiation and the lighting or image-acquiring system comprises a sensor sensitive in the infrared, this allowing detection of targets to be improved independently of surrounding light conditions and/or the device to be made more robust against fraud and/or the purposes of biometric recognition to be served, while optimizing and securing emission in the infrared.

Advantageously, the image-acquiring system comprises at least one motorized mechanism for adjusting line of sight and at least one image sensor, the at least one image sensor preferably including an iris-recognition camera, this making it possible to adequately adjust not only adjustment data such as gain and intensity, but also the positions of one or more (especially panoramic/inclination) motors, so as to ensure the paths of moving targets are tracked, and thus to rapidly orient the one or more cameras toward the target and thus especially to allow biometric acquisition to be done on the fly.

Advantageously, the image-acquiring system comprises at least two image sensors and especially a multiplexer, this for example allowing a panoramic image to be obtained/acquired using a plurality of cameras of smaller field, the multiplexer allowing a single counter (or clock) to be integrated into it with a view to performing the time stamping, rather than there being one per image sensor.

Advantageously, the synchronous data-processing system is a real-time coprocessor and the asynchronous data-processing system is a non-real-time processor, this allowing a non-real-time processor to be used as main processor without penalizing the latency of the system, this architecture increasing the performance of the device and making it more economical.

Advantageously, the real-time coprocessor receives the images acquired by the image-acquiring system and transmits them, each with the associated time-stamped at least one of the adjustment data of the image-acquiring system, in the form of metadata added to each of said acquired images, to the non-real-time processor, the real-time coprocessor comprising the associating means, the synchronous time-stamping means especially being a software counter of the real-time coprocessor, this allowing the acquiring system and the other system to be adjusted in a synchronized manner, with a view to tracking a target, especially by evaluating its path based on the images and on information on configuration at the moment of acquisition of each image, which information is associated by metadata with said image, the time stamping in the real-time processor, combined with the other time base in the non-real-time processor, allowing the association to be made between the time-stamped data of the real-time processor and the acquired image.

Advantageously, the non-real-time processor receives the images acquired by the image-acquiring system, the synchronous time-stamping means especially comprising:
  a physical counter shared between the real-time coprocessor and the non-real-time processor;
or
  a software counter within the non-real-time processor and a software counter within the real-time coprocessor, the timestamp of the acquired image being associated with said acquired image by the non-real-time processor, this making it possible to provide a device in which the real-time coprocessor then does not receive the acquired images, while using, for the time stamping, either a shared means such as a single dual-access counter, optimizing the architecture, or a means duplicated in the processor and coprocessor with two time bases and a means for associating the time-stamped data of the real-time processor and the acquired image.

Advantageously, starting with the second image and for each following image received by the non-real-time processor, the non-real-time processor retrieves the timestamp TS of the associated metadata-containing image, and computes an image number p by rounding (TS−TS of the preceding image) divided by the set period T with which images are captured, this pairwise timestamp comparison through readout of the metadata allowing the images to be numbered and thus making the process insensitive to drift and to the loss of one or more images (poor transmission, transmission error).

Furthermore, another subject of the invention is a biometric system comprising an image-processing device according to the invention, the acquired image being an image of a face and/or iris, this allowing biometric recognition, especially on the fly with moving individuals tracked.

Furthermore, another subject of the invention is an image-processing method comprising steps of:
  acquiring an image;
  performing synchronous time stamping to time stamp, at the moment of acquisition of the image, at least one adjustment datum of an image-acquiring system;
  associating the at least one time-stamped adjustment datum of the image-acquiring system with said image acquired at the moment of acquisition of the image by adding a metadatum to said acquired image;
  performing asynchronous processing on said image with associated metadatum to generate as output at least two setpoints, including at least one image-acquisition setpoint, which is determined based on the acquired image and on the time-stamped at least one adjustment datum of the image-acquiring system associated with said acquired image;
  performing synchronous data processing, input data of the synchronous processing comprising the at least two setpoints including the image-acquisition setpoint, and generating as output, based on at least some of said setpoints, new adjustment data of the image-acquiring system that adjust said image-acquiring system with a view to acquisition of a new image, having the same advantages as the image-processing device according to the invention.

Advantageously,
  one of the two setpoints is a lighting setpoint comprising a luminous-intensity setpoint, which especially comprises an infrared-lighting setpoint; and:
  the synchronous data processing generates as output, based on at least some of said setpoints, adjustment data of the lighting system, to adjust said lighting system;
  this allowing separate systems, such as the acquiring system and the lighting system, to be kept adjusted based on exploitation of their specific adjustment data, which are fused with the image that transports them by means of metadata.

Advantageously, the image-acquisition setpoint comprises an estimated path of an object present in an optical field of image acquisition, the object especially being a biometric characteristic of an individual such as an iris and/or a face, this allowing an object or an individual to be tracked and recognized, especially biometrically, on the fly.

Advantageously, the adjustment data of the image-acquiring system are determined so as to follow said estimated path of the object, this especially allowing a motorized panoramic/inclination mechanism to be adjusted.

Advantageously, in the step of performing synchronous data processing, a table containing the time-stamped adjustment data of at least a last acquired image is created, this allowing the information of the adjustment data to be linked with their timestamp in a time base common to the entire device or associable with another time base of the device, robustly.

Advantageously, the step of performing asynchronous processing comprises executing an algorithm that is different from one frame to the following frame, and especially one algorithm for even frames and another algorithm for odd frames, this allowing two cameras to be created artificially with a single one. One may for example process images of objects and other images of faces of individuals.

Other features and advantages of the invention will become apparent on reading the following description of non-limiting particular modes of implementation of the invention.

DETAILED DESCRIPTION

Figure 1:
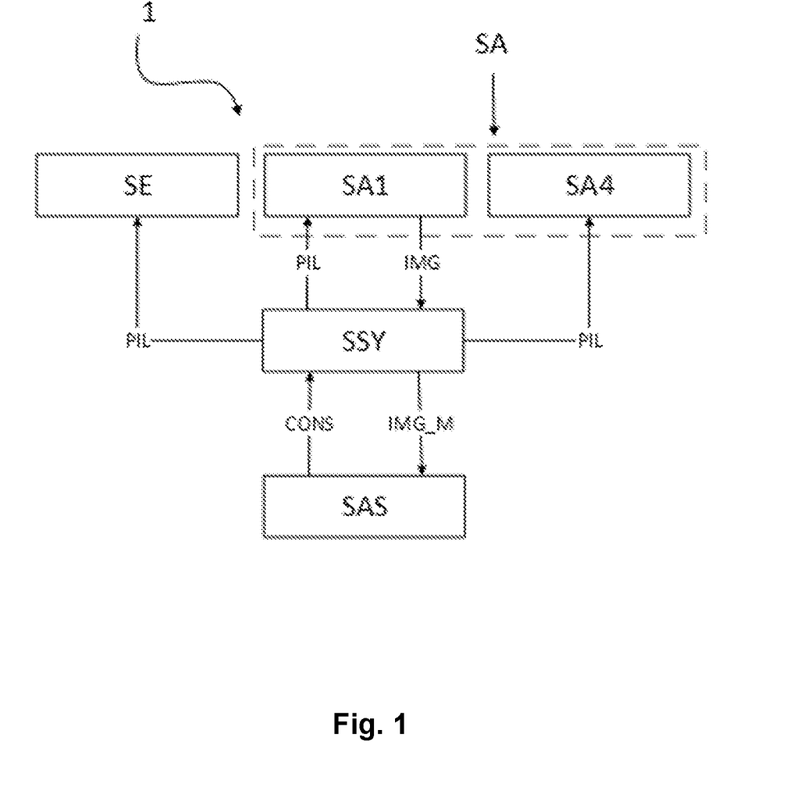
FIG. 1 illustrates one example of an architecture of an image-processing device according to one embodiment of the invention.

With reference to FIG. 1, the architecture of the image-processing device 1 comprises:

- a lighting system SE;
- an image-acquiring system SA, especially comprising two sub-systems, the first being an image sensor SA1, such as a (or more than one) camera(s), especially a context-capturing camera (or a plurality thereof especially for stereoscopy) and a high-resolution camera such as an iris-recognition camera, and the second a motorized mechanism SA4 of the high-resolution camera of the image sensor;
- a synchronous data-processing system SSY;
- an asynchronous data-processing system ASY.

Figure 2:
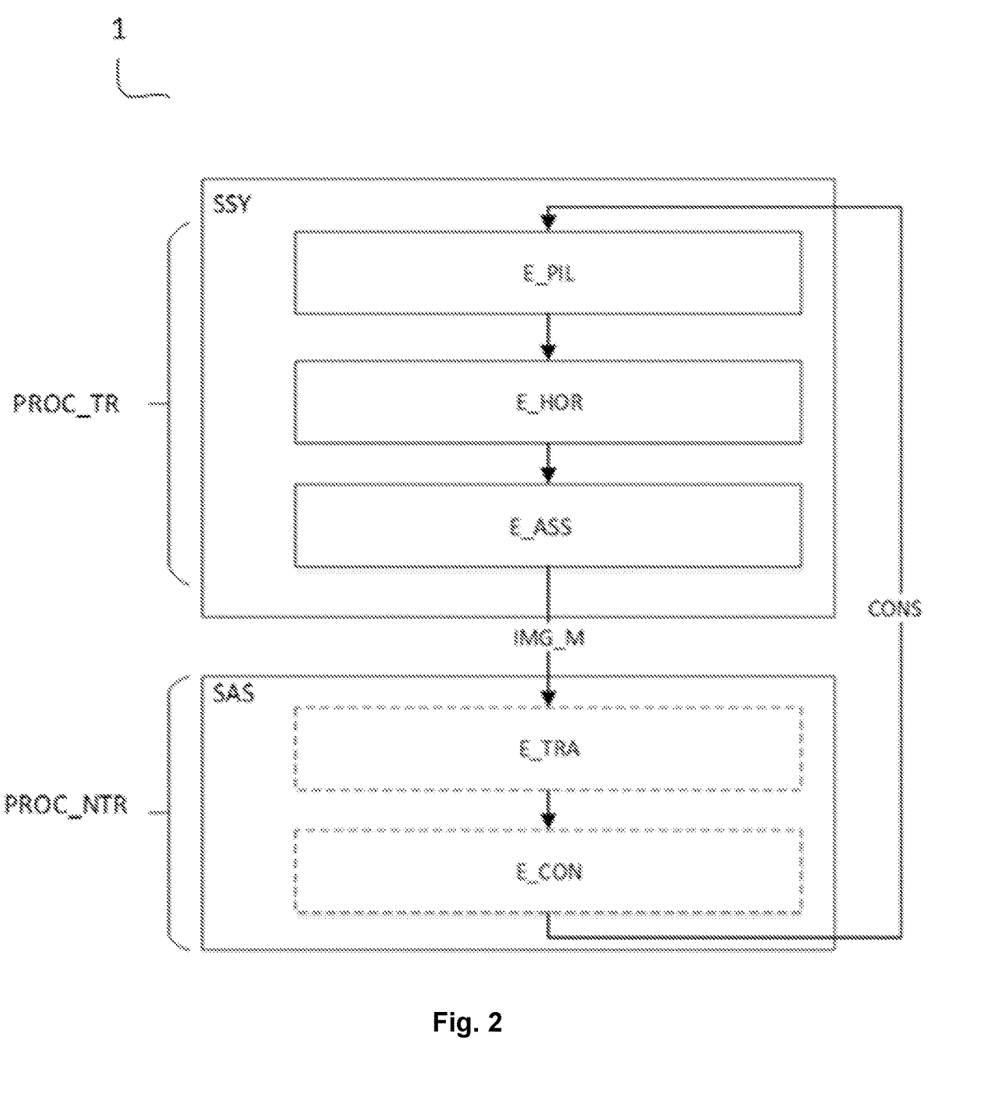
FIG. 2 illustrates a first embodiment of the image-processing device according to the invention.
Figure 3:
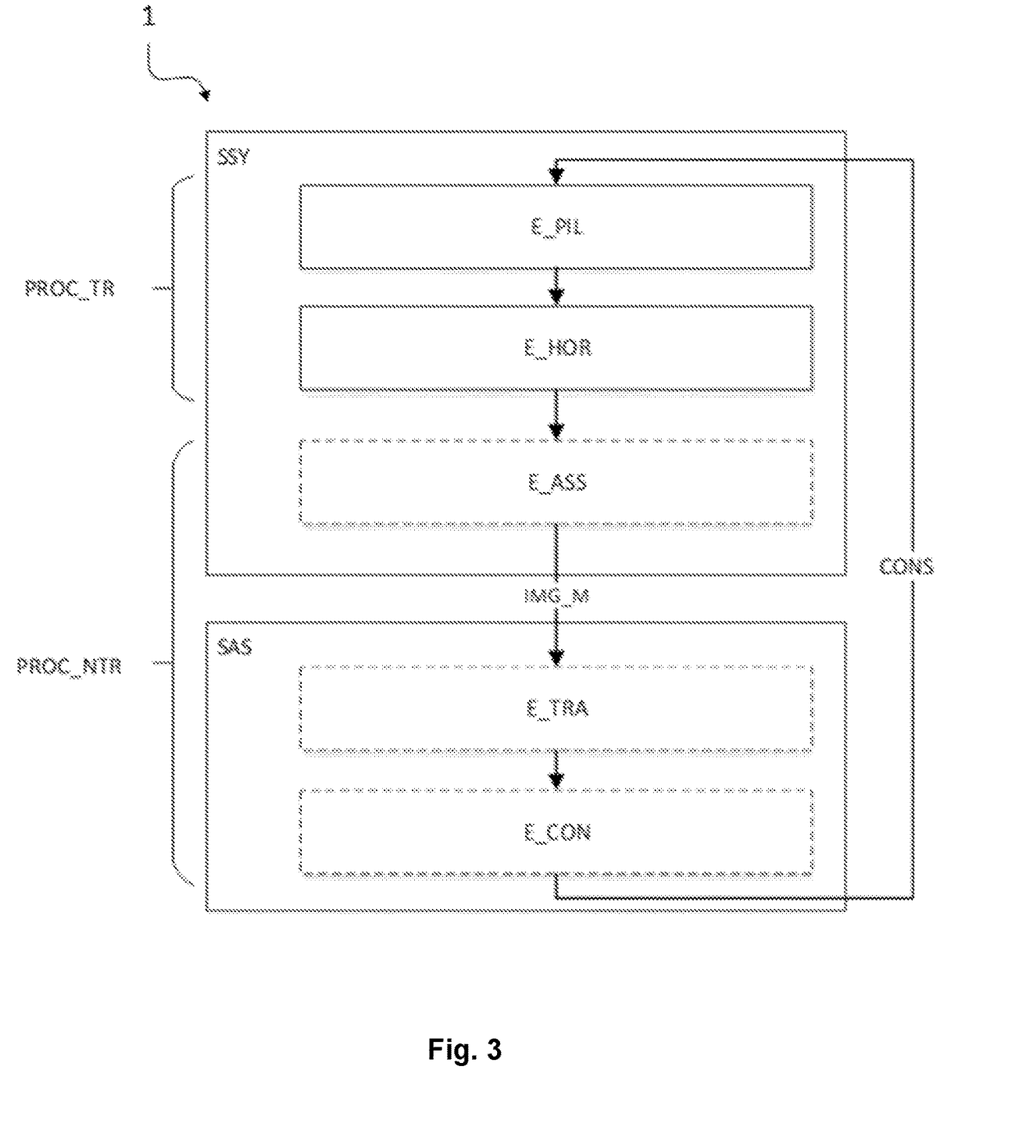
FIG. 3 illustrates a second embodiment of the image-processing device according to the invention.

It will be noted that the associating means has not been shown here for the sake of illustration legibility, and the associating step E_ASS has therefore been shown in FIGS. 2 and 3 under the synchronous system SSY.

In terms of the method of operation of said system, the image-processing method:

- performs, in frame N, a first step of acquiring an image IMG by means of the acquiring system SA, for example according to adjustment data PIL, especially a specific default configuration adopted on initialization, and sends said image IMG to the synchronous system SSY, the image stream preferably being written via the physical transport layer directly into a volatile memory that is read by the processor of the image-processing system;
- in the same frame N of the acquisition (of the image IMG), performs synchronous time stamping, by means of the synchronous system SSY, on at least one of the adjustment data PIL of the image-acquiring system SA applied at the moment of acquisition of said image, for example the gain and/or exposure time of the image sensor SA1 and/or the position, and preferably the speed of movement, of the one or more motors of the motorized mechanism SA4; and preferably here synchronous time stamping of at least one of the adjustment data (also called parameters) PIL of the lighting system SE applied at the moment of acquisition of said image, for example the intensity of the infrared and/or white light;
- associates, by means of said synchronous system SSY, said time-stamped certain adjustment data PIL applied at the moment of acquisition of said image IMG with said acquired image IMG by adding metadata, comprising these adjustment data PIL, to said acquired image, this association of the data PIL of the image IMG acquired in frame N (i.e. at the time n), with the image IMG generated in frame N (i.e. at the time n) possibly being carried out subsequently, and sends the image IMG_M with associated metadata to the asynchronous system SAS;
- at a time equal or subsequent to receipt of the image IMG_M with associated metadata by the asynchronous system SAS, performs asynchronous processing, by means of the asynchronous system SAS, on said image IMG_M with associated metadata, generating as output setpoints CONS that are sent to the synchronous data-processing system SSY, namely at least one image-acquisition setpoint CONS (for example exposure and/or gain and/or position or path) determined based on the image IMG_M with associated metadata, i.e. based on said acquired image IMG and on the time-stamped adjustment data of the image-acquiring system SA associated with said image IMG acquired in frame N, and here additionally a lighting setpoint CONS that is also determined based on the image IMG_M with associated metadata, the setpoints especially being determined based on the image and on the datum/data associated therewith by means of the metadatum;
- in the following or subsequent frame N+1, performs synchronous processing, by means of said synchronous system SSY, on the input data of the synchronous processing operation, these here comprising said two setpoints CONS, and generating as output, based on at least some of said setpoints, new adjustment data PIL of the image-acquiring system SA, these adjusting said image-acquiring system with a view to acquisition of a new image.

Thus, the adjustment data PIL used for a subsequent acquisition (as soon as possible, the delay depending on the design of the device, as explained below) are determined depending on the acquisition configurations applied during acquisition of the preceding image. There is no need to wait for a delay equal to a number of images to have passed to be sure that a configuration is applied, since configuration data are associated with an image by adding a metadatum to said image, the metadatum comprising adjustment data PIL, the link between the image and the adjustment data PIL of the metadatum corresponding to said image being generated by virtue of the time-stamping process. Part of the metadatum may already exist and be inherent to the image-acquiring system SA, this part of the metadatum possibly being a datum different from the mentioned adjustment data PIL, for example the serial number of the camera SA1 or an indicator of the condition or health of the image sensor SA1; in this case, this metadatum is integrated directly into the image IMG acquired by the acquiring system, depending on the image sensor SA1.

To perform the time-stamping process, the synchronous system SSY includes a synchronous time-stamping means and the synchronous system SSY triggers the image sensor SA1—thus the synchronous system SSY knows the moment of exposure and the exposure time exactly. Alternatively, the image sensor SA1 triggers itself and sends a synchronization signal to the synchronous system. Triggering may or may not occur at set intervals when the synchronous system SSY generates the trigger, but preferably occurs at set intervals in the case where the image sensor SA1 triggers itself.

In the embodiment described here, the synchronous system SSY sends the configuration parameters, these also being called adjustment data, of the image-acquiring system SA to the (or the more than one) camera(s) SA1, and keeps a record in memory of these parameters for each acquired image. Preferably, the memory used here is volatile (i.e. a random-access memory or RAM), storage being short-term, the stored data especially expiring after a time equivalent to a few frames.

Likewise, the synchronous system SSY adjusts the lighting system SE and keeps a record in memory of these adjustment data for each acquired image, and especially of the light intensity at the moment of exposure of the (each) camera SA1. Likewise, preferably the memory used here is a volatile RAM, storage being short-term, the stored data especially expiring after a time equivalent to a few frames.

Advantageously, the synchronous system SSY adjusts the motorized mechanism SA4 of the image sensor SA1 so as to place it at the expected position at the moment required according to the path setpoint CONS delivered and computed by the asynchronous system SAS.

The synchronous system SSY may especially record in memory the following adjustment data PIL for each frame:
- exposure and/or gain of the acquiring system SA1;
- light intensity during exposure of the lighting system SE;
- position (x,y,z or tip/tilt/focus) of the motorized mechanism SA4, its speed at the time of the shot.

Advantageously, the synchronous system SSY may trigger the high-resolution camera of the image sensor SA1 only when its motorized mechanism SA4 has positioned it on the path CONS, i.e. when it has reached the path, so that only relevant images are acquired by the high-resolution camera.

The synchronous system SSY associates all the adjustment data PIL with the corresponding image by adding a metadatum, potentially a metadatum already included in said image, and does so for each image of the acquired image stream, so that synchronization can no longer be lost.

Thus, the asynchronous system SAS receives the acquired images IMG with associated metadatum containing the adjustment data PIL of the acquisition system SA specific to the moment of acquisition of said image.

The asynchronous system SAS may then process the received data under no real-time constraints:
- the intensity analysis is executed by the AGC algorithm, especially on a region of interest (ROI) such as the portion of the image containing the face of the user. The result generated as output from the AGC algorithm is a new set of adjustment setpoints CONS from which will be derived a set of new adjustment data PIL (at the time of application, which is chosen by the synchronous system SSY), especially taking the form of configuration parameters of the image sensor SA1 (such as a new exposure time and/or gain) and of the lighting system SE;
- detection of the eyes is executed by an eye-detection algorithm based on a plurality of, and preferably at least two, consecutive images, preferably the most recent images, and generates as output a local tracking path setpoint CONS for the motorized mechanism SA4 of the image sensor SA1.

As soon as these setpoints CONS have been generated, they are transmitted by the asynchronous system SAS to the synchronous system SSY.

Two alternative examples of physical embodiments of system architectures will be described here:
- either the coprocessor is able to receive the acquired images IMG directly, the coprocessor then associating adjustment data PIL taking the form of a metadatum with each image and transmitting to the processor said images IMG_M with associated metadatum;
- or the coprocessor is not able to receive the acquired images IMG, especially as a result of limitations due to its architecture, the acquired images IMG then being transmitted by the acquiring system SA to the processor directly. In this case, the association between the new acquired image and the adjustment data PIL of the metadatum may be achieved by means of the processor using the timestamp recorded by the processor at the moment when the acquired image IMG reaches the processor. Specifically, even with a non-real-time processor, also called a platform, a very high priority may be attributed to the task of recording the timestamp, so that the timestamp is recorded as soon as the image IMG acquired by the processor is received; the timestamp is then saved via a very short, high-priority task on receipt of a call-back interrupt, this interrupt serving to notify the processor that the image has been copied to memory and is available for processing.

The first embodiment, in which the coprocessor receives the acquired images IMG and retransmits them, is illustrated in FIG. 2.

By processor and coprocessor here no indication is given as to the dependence of one on the other, these two terms merely being used for differentiation purposes. In the embodiment illustrated in this figure the synchronous system SSY is a real-time processor PROC_TR, also called the coprocessor, and the asynchronous system SAS is a non-real-time processor PROC_NTR, also called the processor here. In this embodiment, the real-time coprocessor PROC_TR comprises the associating means.

All the steps of the synchronous system SSY are in this first embodiment performed by the real-time processor, the latter receiving adjustment CONS, and:
- in an adjusting step E_PIL, it PROC_TR generates adjustment data PIL in accordance with the setpoints CONS and synchronously adjusts the acquiring system SA (image sensor SA1 and motorized mechanism SA4) and the lighting system SE according to the setpoints by applying thereto adjustment data PIL in accordance with the setpoints CONS, an image IMG then being acquired by the acquiring system SA and transmitted to the real-time processor PROC_TR;
- then, in a step E_HOR, the real-time processor PROC_TR creates a table of time-stamped adjustment data for the acquired image IMG received;
- and, in step E_ASS, the real-time processor PROC_TR adds the time-stamped data in the form of metadata to said image IMG, thus generating the image IMG_M with associated metadata.

All the steps of the asynchronous system SA have been framed with dashed lines and are, in this first embodiment, performed by the non-real-time processor PROC_NTR, the latter PROC_NTR receiving said image IMG_M with associated metadatum, and:
- in a step E_TRA the non-real-time processor PROC_NTR processes the received datum, i.e. the image IMG_M with associated metadatum by analysing it, and more particularly by performing a statistical analysis of the intensity and/or position of the eyes in said image IMG_M with associated metadatum; and
- in step E_CON, determines new setpoint parameters CONS taking the form of parameters regarding exposure and/or lighting and/or creation/update of the path of the eyes, with a view to the following image acquisition.

A second embodiment, in which the coprocessor PROC_TR does not receive the acquired images IMG, is illustrated in FIG. 3, the images IMG being delivered directly to the non-real-time processor PROC_NTR, thus:

as in the preceding embodiment, in an adjusting step E_PIL, it PROC_TR generates adjustment data PIL in accordance with the setpoints CONS and synchronously adjusts the acquiring system SA (image sensor SA1 and motorized mechanism SA4) and the lighting system SE according to the setpoints by applying thereto adjustment data PIL in accordance with the setpoints CONS;

then, as in the preceding embodiment, in the step E_HOR, the real-time processor PROC_TR creates a table of time-stamped adjustment data for the acquired image IMG received.

In this second embodiment, the image IMG is then acquired by the acquiring system SA and transmitted to the non-real-time processor PROC_NTR, the non-real-time processor PROC_NTR executing the steps framed with dashed lines, i.e.: steps of the synchronous system SSY (the associating step having been shown under the synchronous system SSY) and of the asynchronous system SAS, all the steps of the asynchronous system SAS being framed with dashed lines:

in the step E_ASS the non-real-time processor PROC_NTR associates the image IMG with the right metadata by virtue of the timestamp TS, thus generating the image IMG_M with associated metadatum;

as in the preceding embodiment, in step E_TRA, the non-real-time processor PROC_NTR processes the received datum, i.e. the image IMG_M with associated metadatum by analysing it, and more particularly by performing a statistical analysis of the brightness and/or position of the eyes in said image IMG_M with associated metadatum; and in step E_CON, determines new setpoint parameters CONS taking the form of parameters regarding exposure and/or lighting and/or creation/update of the path of the eyes, with a view to the following image acquisition.

For this second embodiment, two different alternatives are described here, thus:

a first alternative consists in a physical counter shared between the real-time coprocessor PROC_TR and the non-real-time processor PROC_NTR, the timestamp TS then being sent to both processors PROC_TR and PROC_NTR at the same time, the non-real-time processor PROC_NTR then asking the real-time coprocessor PROC_TR for the adjustment data corresponding to the received timestamp TS;

a second alternative does not comprise a shared physical counter, but consists in a software counter within the non-real-time processor PROC_NTR and another software counter, independent of the first counter, within the real-time coprocessor PROC_TR, the timestamp TS of the acquired image IMG being associated with said acquired image by the non-real-time processor PROC_NTR. The non-real-time processor PROC_NTR must then know the offset between the two independent timestamps TS. This offset may be measured on receipt of the first image IMG, by comparing the timestamp TS of the non-real-time processor PROC_NTR and timestamp TS of the real-time coprocessor PROC_TR, which is recorded in the form of a metadatum in said first image. Specifically, it is possible for there to be an offset between the two timestamps TS, especially a drift with time, and this mode of determination allows, on the first image acquisition after the device is turned on, this offset to be determined so that it may be known for the entire series of acquisitions, it preferably being considered to remain constant throughout each working session.

Furthermore, this drift may be compensated for by applying a filter so as to continuously adapt the offset based on the latest measured offsets.

Figure 4:
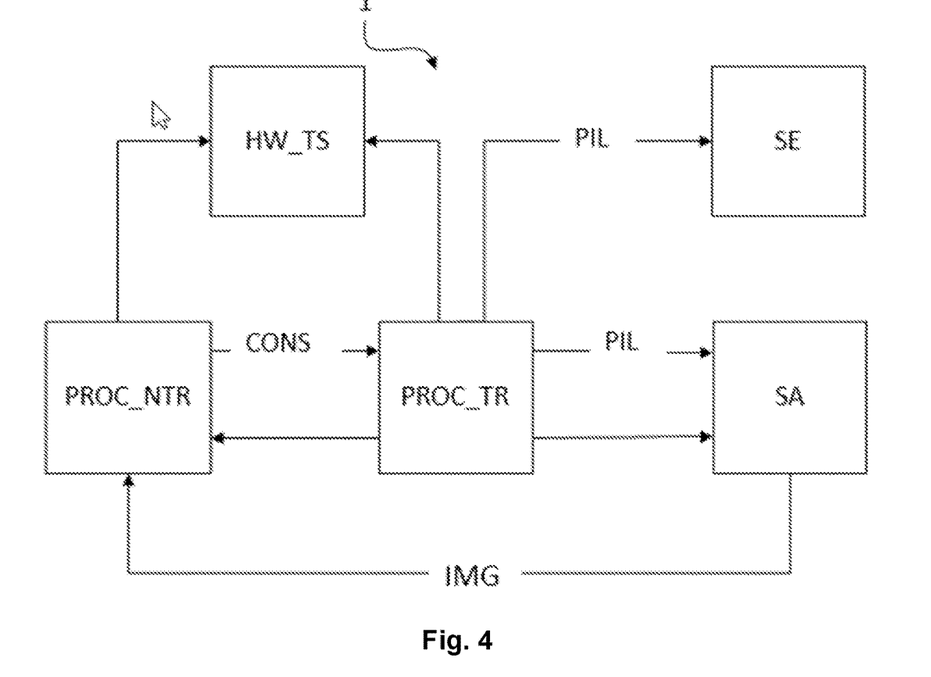
FIG. 4 illustrates one example of an image-processing device according to a first alternative of the second embodiment.

FIG. 4 illustrates an image-processing device according to the invention, and more particularly according to the first alternative of the second embodiment, and comprising the following components:

a non-real-time processor PROC_NTR, here a main processor, running an operating system not designed for real-time processing, for example an ARM Cortex A53 running Linux;

a real-time coprocessor PROC_TR running an operating system designed for real-time data processing, for example a Cortex M7+FreeRTOS;

a common time-stamping counter shared between the non-real-time processor PROC_NTR and the real-time coprocessor PROC_TR;

a communication channel between the non-real-time processor PROC_NTR and the real-time coprocessor PROC_TR;

a communication channel between the real-time coprocessor PROC_TR and the image-acquiring system SA.

The coprocessor PROC_TR is connected directly to the image sensor of the image-acquiring system SA and to the lighting system SE, and more precisely to the light-emitting diodes (LEDs) of the lighting system SE.

The coprocessor PROC_TR controls:

the exact moment at which the image-acquiring system is triggered (thus the exact time at which the image is acquired/captured);

the exact time at which the adjustment data PIL (for example exposure and gain) are applied, and potentially their duration of application;

the exact time at which the intensities of the LEDs of the lighting system SE are updated, potentially on each frame.

In this example, an IMX8MPLUS chip is used and inside the chip there is: a main non-real-time processor PROC_NTR: an A53, and a real-time coprocessor PROC_TR: a Cortex M7, and the single physical clock, or counter, HW_TS is inside the chip, and shared because it is accessible both to the A53 processor PROC_NTR and to the M7 coprocessor PROC_TR.

Figure 5:
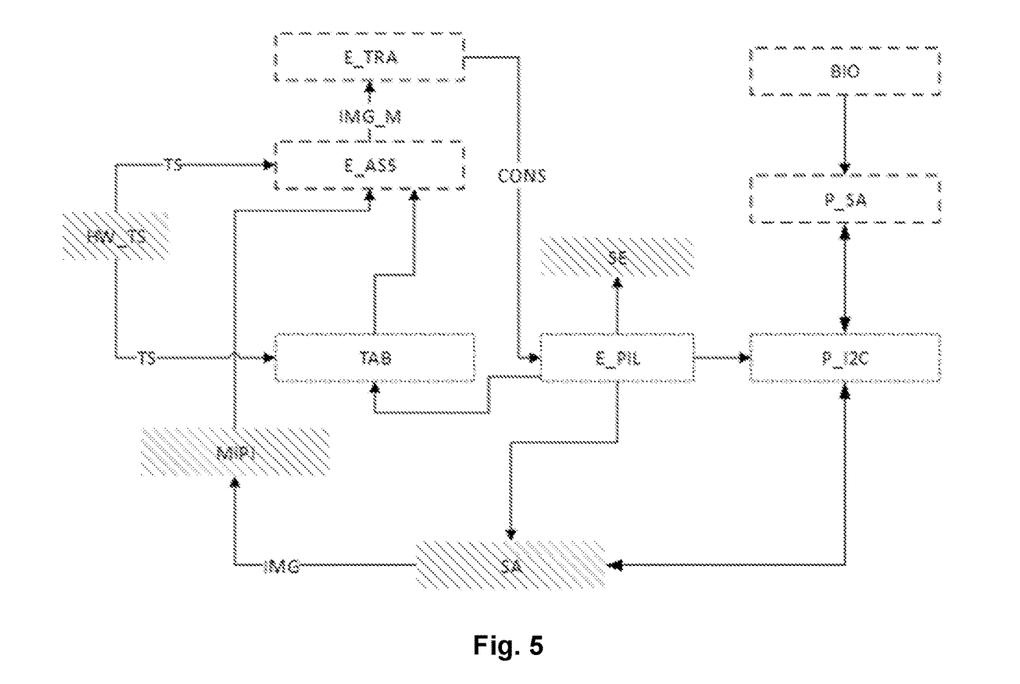
FIG. 5 illustrates the architecture and the exchanges between the various components of an image-processing device according to a first alternative of the second embodiment.

FIG. 5 partially illustrates operation of this architecture; for the sake of clarity, all the steps have not been shown; components or steps executed by the non-real-time processor PROC_NTR have been framed with dashed lines and components or steps executed by the real-time processor PROC_TR have been framed with solid lines and physical components have been represented by hatched regions.

The component BIO initializes, then will subsequently halt, by means of initialization and stop signals, the program P_SA used to adjust the camera of the image-acquiring system—the program P_SA communicates setpoints to P_I2C of M7. The program P_I2C communicates with the image sensor of the image-acquiring system SA, especially by means of an I2C protocol. Next, the first acquired image IMG, and more generally the stream of images IMG, transits through the receiving component MIPI before being sent to the non-real-time processor PROC_NTR, and in parallel, the real-time coprocessor PROC_TR samples, i.e. retrieves the current value of, the shared counter HW_TS at the moment when the image is acquired, then the processor PROC_NTR samples the shared counter HW_TS a short time later, as soon as it receives the image, via the call-back interrupt, and it is thus that the timestamp corresponding to the moment of acquisition of said image and of its receipt is attributed, which timestamp the processor records in a local memory in the form of a table TAB, which especially contains, for an infrared sensor of the acquiring system, the adjustment data, or configuration parameters, at the moment of acquisition of each image IMG: timestamp TS of the moment of acquisition of said image, exposure time of said image IMG, gain of said image IMG, pulse width modulation of the infrared light source at the moment of acquisition of said image IMG, and for an red-green-blue (RGB) light sensor of the acquiring system, the adjustment data, or configuration parameters, at the moment of acquisition of each image IMG: timestamp TS of the moment of acquisition of said image IMG, exposure time of said image IMG, gain of said image IMG, pulse width modulation of the white light source at the moment of acquisition of said image IMG, this table TAB of the M7 real-time coprocessor PROC_TR thus providing the data required by the associating step E_ASS executed by the non-real-time processor PROC_NTR, which may then synchronize the received image IMG acquired at the time TS with the adjustment data applied at said timestamped time TS by adding metadata to the IMG, thereby creating the image IMG_M with associated metadata. For each image and for each image sensor, the associated metadata are then here: exposure time, gain, the pulse width modulation of the infrared light source, the pulse width modulation of the white light source, and the distance to the object captured in the image (determined by 3D analysis and/or on the basis of interpupillary distance, inter alia).

The non-real-time processor PROC_NTR then, in step E_TRA, processes this image IMG_M (or a plurality of images, such as the last two) with associated metadatum, using the AGC algorithm.

Next, the processor PROC_NTR sends, to the coprocessor PROC_TR, setpoints CONS for the future acquisition, especially comprising: exposure time, gain, the pulse width modulation of the infrared light source, and the pulse width modulation of the white light source. As a variant, the setpoints CONS may consist in the same parameters (exposure, gain) for a future even acquisition frame and for a future odd acquisition frame.

Next, in step E_PIL, future triggering of the sensors of the acquiring system SA and of an LED light source of the lighting system SE is controlled by the coprocessor PROC_TR depending on the new synchronized adjustment data PIL, these data here being the same as the setpoints CONS and not requiring additional processing. In parallel, the coprocessor PROC_TR records these new data with their timestamp of the clock HW_TS in the local memory of the coprocessor PROC_TR as explained above.

Next, the process continues iteratively.

For each captured image (image frame number N), the coprocessor PROC_TR executes the following steps:

1—configuring the gain and exposure of each sensor, taking into consideration the exact delay required by the sensor to apply the new set of adjustment data exactly to frame number N;

2—adjusting the LEDs of the lighting system SE according to the adjustment datum PIL corresponding to the required intensity exactly throughout the acquisition time of frame number N, the moment of acquisition of the latter being known exactly. In the case of an infrared LED source (light not visible), the source is turned off when the exposure time ends, and in the case of a white light source, the latter may continue to emit so as to prevent any discomfort from being felt as a result of an abruptly varying light level;

3—recording in memory, preferably local memory, the following data in a table:
timestamp TS, i.e. the timestamped value of the clock (counter) time at the moment of acquisition of the image of frame number N;
the adjustment data (gain, exposure) applied at the moment of acquisition of frame number N;
the intensities of the (infrared and/or white) LEDs;

4—triggering (signal transmission) the acquiring system SA with a view to capturing the next image: image frame number N+1.

Figure 6:
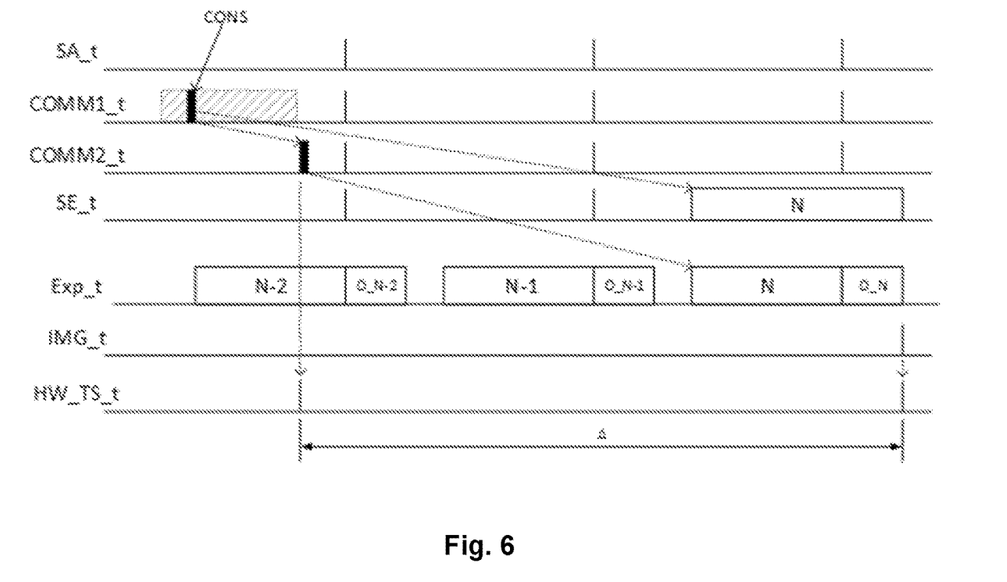
FIG. 6 is one example of a timing diagram of the method according to the invention in its application to an image-processing device according to a first alternative of the second embodiment.

The timing diagram of FIG. 6 illustrates in its various rows the distribution over time of the signals:
SA_t: camera of the acquiring system SA triggered;
COMM1_t: message (setpoint CONS) communicated from the processor PROC_NTR to the coprocessor PROC_TR;
COMM2_t: message (adjustment data PIL) communicated from the processor PROC_NTR to the acquiring system SA;
SE_t: light intensity generated by the lighting system SE;
Exp_t: acquiring system SA exposed;
IMG_t: image IMG received by the processor PROC_NTR;
HW_TS_t: time stamp by the clock (counter).

Thus, in first five rows are reproduced the Dirac functions present in row Sa_t that represent the frame transitions of the acquiring system SA.

In row COMM1_t, the hatched region represents the permitted time range of message receipt specific to frame number N and the thick vertical line represents the moment at which the message containing the gain and exposure, and the intensity of the LEDs to be applied, i.e. CONS, is sent, from which line two dotted arrows point, one designating the resulting transmission of the adjustment data PIL (represented by a thick vertical line in row COMM2_t at the time corresponding to the end of the hatched region because, to be taken into account, COMM1_t must absolutely arrive at the very latest at the start of COMM2_t, and especially in the same frame) and the other designating, in the row Se_t application of the new light-intensity adjustment data by the lighting system SE, knowing that the delay before application of a new configuration is here set and known (length of two frames) and hence that the new intensity and new exposure (arrow pointing from the thick vertical line in row COMM2_t) will be applied two frames later: during frame N.

In row Se_t, box N illustrates the time range during which the new intensity will be applied, and in row Exp_t for each frame is shown one time range N-2, N-1, N representing the period of exposure specific to each frame and one time range O_N-2,O_N-1,O_N representing the period of transfer of the image to the coprocessor PROC_NTR.

It may be seen here that it is the command COMM2_t that is sent to the acquiring system SA and that will be taken into account for frame N, because the acquiring system SA does not receive COMM1_t directly, whereas the lighting system SE is adjusted directly by PROC_TR, and hence the command concerning it is that received in COMM1_t directly. In row IMG_t, the vertical line illustrates transmission of the interrupt signal allowing receipt of image n by the processor PROC_NTR.

In row HT_TS_t, a vertical arrow pointing from the transmission of the adjustment data PIL, which is represented by a thick vertical line in row COMM2_t, designates a first vertical line corresponding to the timestamp generated by the coprocessor PROC_TR. A second vertical line is designated by a vertical arrow pointing downward from the interrupt signal and corresponding to the timestamp generated by the processor PROC_NTR at the moment of receipt of image n by the processor PROC_NTR, and knowledge of these two frames allows the image N to be associated with the configuration parameters specific to the adjustment of the acquiring system SA and lighting system SE at the time of acquisition of image N. The length of time A between the two timestamps is constant, known and defined by the design of the image-acquiring device.

Thus, when the acquired image is received by the processor PROC_NTR, the time increment of the clock (physical counter) is read and associated with the acquired image. These two pieces of information are transmitted to the AGC algorithm executed on the processor PROC_NTR, then the algorithm sends a message to the coprocessor PROC_TR with a view to obtaining the data table. By referring to the column of the table containing the timestamp, the AGC algorithm can associate the acquired image with the configuration parameters defined by the adjustment data PIL applied to the sensor at the moment of acquisition of the image. There are thus no real-time constraints on the AGC algorithm—even if the software moves on and CPU load increases, the AGC is still able to remain functional and avoid the risk of error. As the objective of the AGC is to change the parameters of exposure and/or gain and/or LED intensity depending on the preceding images with a view to optimizing the image, given the latency (for example 2 or 3 frames) between an analysed image and the next image that will take into account the new setpoints CONS, there is no point in changing the parameters of intermediate images, nevertheless it is possible for the AGC to change exposure and/or gain and/or LED intensity for each frame in two cases in which it is advantageous:

implementation of two AGCs operating in parallel, one processing even frames, the other odd frames, the two AGC algorithms being completely independent and making possible adaptation of the shot taken by the acquiring system SA to two different types of objects. For example, one AGC optimized to detect and read Quick Response or QR codes, especially QR codes that are printed or displayed on a screen, and that allow access to be granted to buildings or information, and another optimized to detect a user's face, this thus allowing two virtual cameras to be created artificially while employing only a single physical camera: for example, one ACG takes a bright photo and the other a dark photo through adjustment of exposure time (preferably, the bright photo is intended for facial acquisition and the darker one for acquisition of QR codes because QR codes are usually lighter);

implementation of an exposure-scan AGC strategy whereby the parameters of exposure/gain/LED intensity may be changed for each frame, especially until a face is "secured", for example by increasing exposure, so as to detect the face or another object whatever the light level, from complete darkness to full sun. This type of AGC algorithm allows a face to be detected even under very difficult conditions, for example when very brightly backlit, or when a small face is framed by a very dark background.

Figure 7:
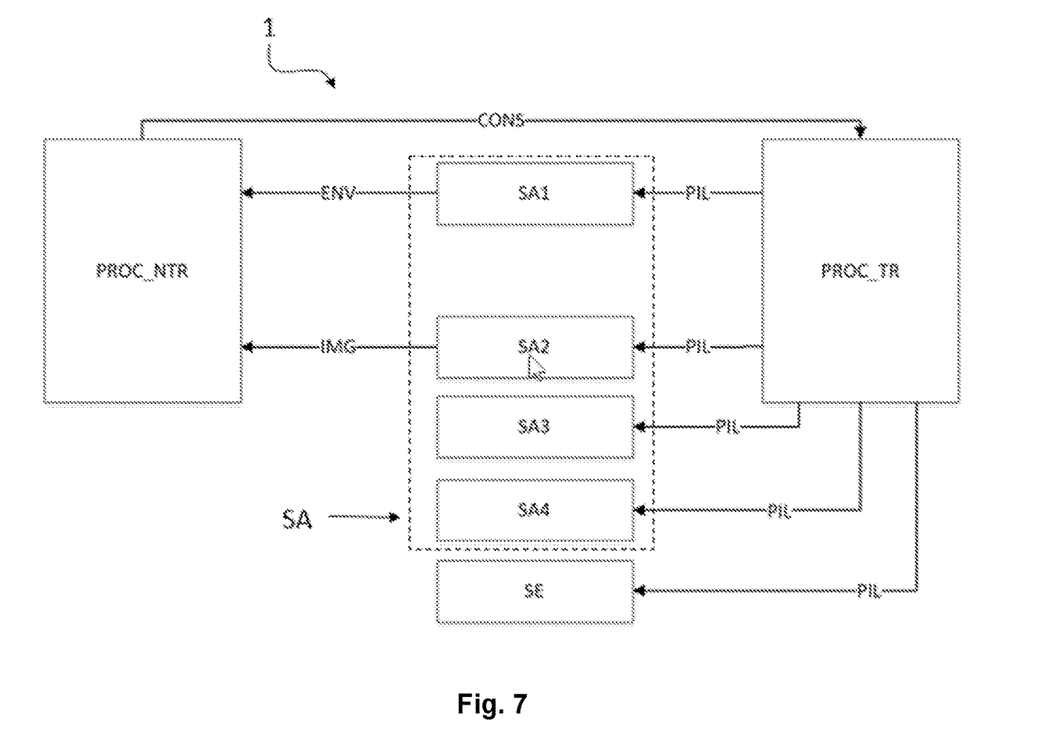
FIG. 7 illustrates one example of an image-processing device according to a second alternative of the second embodiment.

FIG. 7 illustrates one example of an image-processing device according to the invention, and more particularly according to the second alternative of the second embodiment, its architecture comprising:

a processor PROC_NTR on which is executed the main application and the image processing, this processor being orchestrated by a non-real-time (Linux) operating system;

a "context-capturing camera" system SA1 allowing the user to be located in 3D space, for example via a stereo-vision system (or equivalently a time-of-flight camera, or a structured-light 3D vision system) and here comprising two cameras, the image stream thus generated is referenced ENV;

a high-resolution iris-recognition camera system SA2 generating a stream of iris images IMG;

a system SA3 for focusing the iris-recognition camera allowing the position of the focal plan of this camera to be modified;

a motorized mechanism SA4 for adjusting line of sight, here making panoramic/inclination adjustments, i.e. what is also called a pan/tilt motor, allowing the iris-recognition camera to be directed in any X/Y direction of the capture volume with a view to targeting the eyes of the user;

a lighting system SE or illuminator allowing the irises to be illuminated during the shot; and a real-time processor PROC_TR.

The processor PROC_TR, here also called the coprocessor, is responsible for real-time tasks and, in this respect, sends adjustment data PIL (especially based on the received setpoints CONS), thus:

it triggers capture of the images of the context-capturing cameras SA1 at regular intervals (for example at a frequency of 15 Hz)

it adjusts the movements of the pan/tilt motors SA4 (for example with servo-control of position and/or speed)

it adjusts the movements of the focus motor of the system SA3 for focusing the iris-recognition camera it triggers image capture by the iris-recognition camera SA2 at the correct time it activates the illuminator SE to achieve iris illumination synchronously with the shot.

The processor PROC_NTR, here the main processor, receives a stream of context images.

In these images it detects the presence of a potential face and in this case it locates in 3 dimensions the eyes of the individual in the field of view of the "context-capturing camera" system SA1 of the device.

On the basis of these three-dimensional coordinates, the main processor PROC_NTR estimates the path of the eyes, then sends the description of this path to the coprocessor. The coprocessor PROC_TR servo-controls the position and speed of the pan/tilt motors SA4 so as to reach as quickly as possible the setpoint path CONS that was sent thereto by the main processor PROC_NTR.

When the pan/tilt motors SA4 have "secured" the ideal path, the coprocessor PROC_TR triggers iris image capture periodically.

The more often the coprocessor PROC_TR receives path updates, the closer it will approach to the actual path of the eyes.

Figure 8:
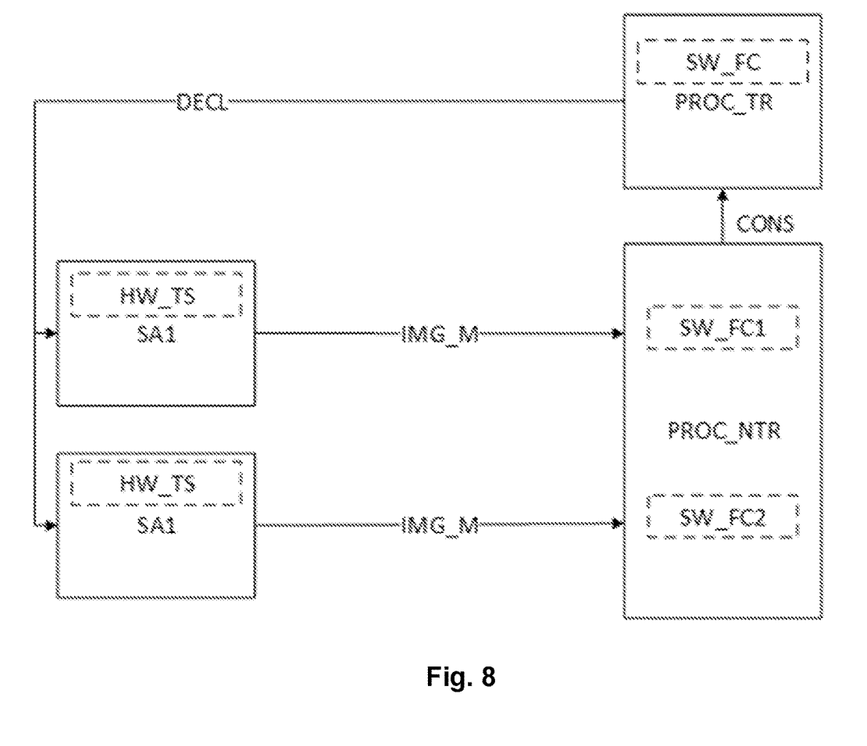
FIG. 8 illustrates a mechanism of synchronization of an image-processing device according to a second alternative of the second embodiment.

The advantage of the illustrated synchronization mechanism detailed with reference to FIG. 8 is that transmission of commands by the main processor PROC_NTR is not subject to real-time constraints, this allowing a multi-task non-real-time operating system to be used.

For example, the estimated path of the eyes becomes a command for adjusting the motors, but it is also possible for, between the path estimation and the command of the motors, there to be an additional filtering step or the like and for the two pieces of information to not necessarily be identical.

Real-time synchronization is ensured in the following way:
- the coprocessor PROC_TR triggers image capture by the two context-capturing cameras SA1. Each time it increments its software frame counter SW_FC, and stores locally especially the following pair of data: Tlast=current frame-counter value and TSlast=timestamp TS of the trigger signal DECL;
- each context-capturing camera SA1 generates, as output, one and only one image for each trigger signal DECL, said context-capturing cameras SA1 being configured to operate in slave mode;
- each context-capturing camera SA1 possesses a hardware counter HW_TS allowing each image to be time stamped with a timestamp TS;
- this timestamp TS is associated with each image by way of metadatum by each context-capturing camera SA1, thus transmitting the images IMG_M with their associated metadata to the main processor PROC_NTR;
- the main processor PROC_NTR possesses one image software counter SW_FC1, SW_FC2 for context-capturing camera SA1.

Initialization happens in the following way:
- the streams from the context-capturing cameras SA1 are initially stopped, and the coprocessor PROC_TR does not generate any trigger signals DECL;
- the main processor PROC_NTR asks the coprocessor PROC_TR to set its frame software counter SW_FC to 0;
- the main processor sets its own counters to zero;
- the main processor PROC_NTR sends a command to the coprocessor PROC_TR with a view to initiating generation of the trigger signal DECL triggering the images with a set period T (in seconds, for example 1/15 s);
- when the first image IMG_M of each context stream is delivered to the main processor PROC_NTR, the latter stores the timestamp TS contained in the image IMG_M and it associates image number 0 with this first image IMG_M, by way of new additional metadatum.

Starting with the second image and for each following image received by the main processor PROC_NTR:
- the main processor PROC_NTR retrieves the timestamp TS of the image IMG_M, and computes p=result of rounding ((TS−TS of the preceding image)/T), and this pairwise (last two images) timestamp comparison with a view to numbering the images thus makes the process insensitive to drift and to loss of one or more images (poor transmission, transmission error);
- it increments its frame counter SW_FC1, SW_FC2 associated with the camera SA1 from which the image IMG_M of value p came.

The advantage of the method is that, in case of high load on the processor PROC_NTR, which would potentially result in loss of images IMG_M, by virtue of the timestamp TS contained in the images IMG_M, the synchronization of the frame counters SW_FC1, SW_FC2 is not lost.

The synchronization is therefore never called into question, whatever the load on the main processor PROC_NTR.

The same synchronization is also applied in the case where more than two context-capturing cameras SA1 are used, it then sufficing to duplicate the counters HW_TS and SW_FC.

Figure 9:
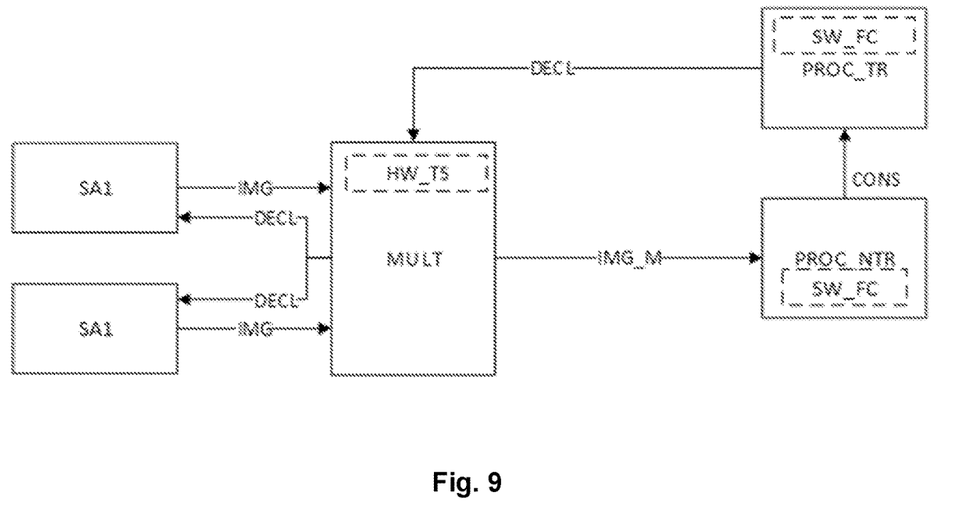
FIG. 9 illustrates a mechanism of synchronization of an image-processing device according to a second alternative of the second embodiment and comprising a multiplexer.

With reference to FIG. 9, it should be noted that the principle does not change in the case where 2 (or more) context-capturing cameras SA1 are multiplexed. The multiplexer MULT (for example an MIPI CSI multiplexer) here triggers image capture by both context-capturing cameras SA1 at the same time, on receipt of a trigger signal DECL (comparable to an adjustment datum PIL) by the coprocessor PROC_TR.

In this case it is the multiplexer MULT that inserts the timestamp TS into the metadata of the images IMG_M.

The nub of the invention resides in use of a real-time processor PROC_TR to accurately keep an association between the captured, i.e. acquired, image IMG, EV and the adjustment data PIL, i.e. the acquisition parameters, i.e. the parameters of capture, of this image, i.e. parameters such as the configuration parameters of the sensors, illuminance, the mechanical positions and speeds of the motors directing the cameras, etc., at the time at which acquisition/capture of said image is triggered. The complexity of the system may be relatively high or low (for example it may or may not comprise a lighting system, or a motorized camera-pointing mechanism) and likewise the number of data in question may be relatively high or low, these data for example being the exposure time/gain and the illuminance, or for example only path-management positioning data, or even a mixture of all or some of these data to which other data may be added as required and depending on the application.

The invention claimed is:

1. An image-processing device comprising:
an image-acquiring system;
a synchronous data-processing system that receives at least two setpoints including at least one image-acquisition setpoint, and that generates, depending on at least some of said setpoints, adjustment data of the image-acquiring system, said synchronous system including a synchronous time-stamping means that adds, at a moment of acquisition of an image, a time stamp to the adjustment data of the image-acquiring system;
associating means for associating the time-stamped at least one of the adjustment data of the image-acquiring system with said image acquired at the moment of acquisition of the image by adding metadata to said acquired image; and
an data-processing asynchronous system that processes said acquired image with associated metadata, said asynchronous data-processing system generating and sending to the synchronous data-processing system the at least two setpoints, at least the image-acquisition setpoint of which is determined based on at least one of the acquired images with associated metadata and on the time-stamped at least one of the adjustment data of the image-acquiring system associated with said at least one acquired image.

2. The image-processing device according to claim 1, further comprising an other system, different from the image-acquiring system, and at least one of the two setpoints is a setpoint intended for the other system, the synchronous data-processing system determining, depending on at least some of said setpoints, adjustment data of the other system, said synchronous time-stamping means time stamping, at the moment of acquisition of the image, at least one of the adjustment data of the other system,
wherein the associating means associates at least one of time-stamped adjustment data of the other system with said image acquired at the moment of acquisition of the image, by adding metadata to said acquired image, and
wherein the asynchronous data-processing system generates and sends to the synchronous data-processing system the at least two setpoints, the setpoint intended for the other system being determined based on at least one of the acquired images and on the time-stamped at least one of the adjustment data of the other system and/or of the image-acquiring system associated with said at least one acquired image.

3. The image-processing device according to claim 2, wherein the other system is a lighting system and the setpoint, intended for the other system, is a lighting setpoint.

4. The image-processing device according to claim 3, wherein the lighting system includes a source of infrared radiation and the lighting system or image-acquiring system includes a sensor sensitive in the infrared.

5. The image-processing device according to claim 1, wherein the image-acquiring system includes at least one motorized mechanism that adjusts line of sight and at least one image sensor, the at least one image sensor including an iris-recognition camera.

6. The image-processing device according to claim 1, wherein the synchronous data-processing system is a real-time coprocessor and the asynchronous data-processing system is a non-real-time processor.

7. The image-processing device according to claim 6, wherein the real-time coprocessor receives the images acquired by the image-acquiring system and transmits the images, each with the associated time-stamped at least one of the adjustment data of the image-acquiring system, in the form of metadata added to each of said acquired images, to the non-real-time processor, the real-time coprocessor includes the associating means, the synchronous time-stamping means being a software counter of the real-time coprocessor.

8. The image-processing device according to claim 6, wherein the non-real-time processor receives the images acquired by the image-acquiring system, the synchronous time-stamping means including:
a physical counter shared between the real-time coprocessor and the non-real-time processor; or
a software counter within the non-real-time processor and a software counter within the real-time coprocessor, a timestamp of the acquired image being associated with said acquired image by the non-real-time processor.

9. A biometric system comprising the image-processing device according to claim 1, the acquired image being an image of a face and/or iris.

10. An image-processing method comprising:
acquiring an image;
performing synchronous time stamping in order to time stamp, at the moment of acquisition of the image, at least one adjustment datum of an image-acquiring system;
associating at least one time-stamped adjustment datum of the image-acquiring system with said image acquired at the moment of acquisition of the image by adding a metadatum to said acquired image;
performing asynchronous processing on said image with associated metadatum to generate, as output, at least two setpoints, including at least one image-acquisition setpoint, which is determined based on the acquired image and on the time-stamped at least one adjustment datum of the image-acquiring system associated with said acquired image; and
performing synchronous data processing, input data of the synchronous processing including the at least two setpoints including the image-acquisition setpoint, and generating as output, based on at least some of said setpoints, new adjustment data of the image-acquiring system that adjust said image-acquiring system with a view to acquisition of a new image.

11. The image-processing method according to claim 10, wherein:
one of the two setpoints is a lighting setpoint including a light-intensity setpoint, which includes an infrared-lighting setpoint, and
the synchronous data processing generates as output, based on at least some of said setpoints, adjustment data of lighting system, in order to adjust said lighting system.

12. The image-processing method according to claim 10, wherein the image-acquisition setpoint includes an estimated path of an object present in an optical field of image acquisition, the object being a biometric characteristic of an individual including an iris and/or a face.

13. The image-processing method according to claim 12, wherein adjustment data of the image-acquiring system are determined to follow said estimated path of the object.

14. The image-processing method according to claim 10, wherein, in the performing synchronous data processing, a table containing the time-stamped adjustment data of at least a last acquired image is created.

15. The image-processing method according to claim 10, wherein performing asynchronous processing further comprises executing an algorithm that is different from one frame to the following frame, and one algorithm for even frames and another algorithm for odd frames.

16. An image-processing device, comprising:
an image-acquiring system;
a synchronous data-processing system that receives at least two setpoints including at least one image-acquisition setpoint, and that generates, depending on at least some of said setpoints, adjustment data of the image-acquiring system, said synchronous system including synchronous time-stamping circuitry that adds, at the moment of acquisition of an image, a time stamp to the adjustment data of the image-acquiring system;
associating circuitry configured to associate the time-stamped at least one adjustment data of the image-acquiring system with said image acquired at the moment of acquisition of the image by adding metadata to said acquired image; and
an data-processing asynchronous system that processes said acquired image with associated metadata, said asynchronous data-processing system generating and sending to the synchronous data-processing system the at least two setpoints, at least the image-acquisition setpoint of which is determined based on at least one of the acquired images with associated metadata and on the time-stamped at least one of the adjustment data of the image-acquiring system associated with said at least one acquired image.

17. The image-processing device according to claim 2, wherein the image-acquiring system includes at least one motorized mechanism that adjusts line of sight and at least one image sensor, the at least one image sensor including an iris-recognition camera.

18. The image-processing device according to claim 3, wherein the image-acquiring system includes at least one motorized mechanism that adjusts line of sight and at least one image sensor, the at least one image sensor including an iris-recognition camera.

19. The image-processing device according to claim 4, wherein the image-acquiring system includes at least one motorized mechanism that adjusts line of sight and at least one image sensor, the at least one image sensor including an iris-recognition camera.

20. The image-processing device according to claim 2, wherein the synchronous data-processing system is a real-time coprocessor and the asynchronous data-processing system is a non-real-time processor.

* * * * *